United States Patent [19]
Ryan et al.

[11] Patent Number: 4,747,759
[45] Date of Patent: May 31, 1988

[54] TURBOCHARGER HOUSING

[75] Inventors: Michael E. Ryan, Fairhope; J. Albert McEachern, Jr., Mobile; J. William Brogdon, Daphne, all of Ala.

[73] Assignee: Teledyne Industries, Inc., Los Angeles, Calif.

[21] Appl. No.: 22,530

[22] Filed: Mar. 6, 1987

Related U.S. Application Data

[63] Continuation of Ser. No. 890,785, Jul. 23, 1986, abandoned, which is a continuation of Ser. No. 739,423, May 30, 1985, abandoned.

[51] Int. Cl.⁴ .............................................. F04B 17/00
[52] U.S. Cl. .................................................... 417/407
[58] Field of Search ...................... 417/405, 406, 407; 60/600, 602; 415/164

[56] References Cited

U.S. PATENT DOCUMENTS

| | | | |
|---|---|---|---|
| 2,646,210 | 7/1953 | Kohlmann et al. | 417/407 |
| 2,822,974 | 2/1958 | Mueller | 417/407 |
| 3,010,697 | 11/1961 | Lazo et al. | 417/407 |
| 3,099,385 | 7/1963 | Elford | 417/407 |
| 3,211,362 | 10/1965 | Laskey et al. | 417/407 |
| 4,122,673 | 10/1978 | Leins | 417/407 |
| 4,181,466 | 1/1980 | Owen . | |
| 4,414,725 | 11/1983 | Breitweiser et al. | 29/156 |

FOREIGN PATENT DOCUMENTS

| | | |
|---|---|---|
| 138516 | 4/1985 | European Pat. Off. . |
| 1199158 | 7/1970 | United Kingdom . |
| 1427659 | 3/1976 | United Kingdom . |
| 1473248 | 5/1977 | United Kingdom . |
| 1574942 | 9/1980 | United Kingdom . |

Primary Examiner—Louis J. Casaregola
Assistant Examiner—Timothy S. Thorpe
Attorney, Agent, or Firm—Gifford, Groh, VanOphem, Sheridan, Sprinkle and Dolgorukov

[57] ABSTRACT

A turbocharger housing comprises a central housing portion having means for rotatably supporting the turbocharger shaft and a pair of end housing portions adapted to be bolted to the central housing portion at mating annular surfaces of each housing portion. In one advantageous form of the present invention, the end housing portions include a recessed wall for defining a flow passageway adjacent a radially expanded wall portion of the central housing, and a plurality of vanes are integrally formed on the end housing portion to extend outwardly from the recessed wall toward a mating annular surface on the central housing portion. One or more sets of radially spaced mating annular surfaces provides a secure engagement between the end housing portions and the central housing portion. Moreover, the end plates are removably secured to the central housing portion so that the turbocharger mechanism can be removed as a unit with the central housing portion.

2 Claims, 2 Drawing Sheets

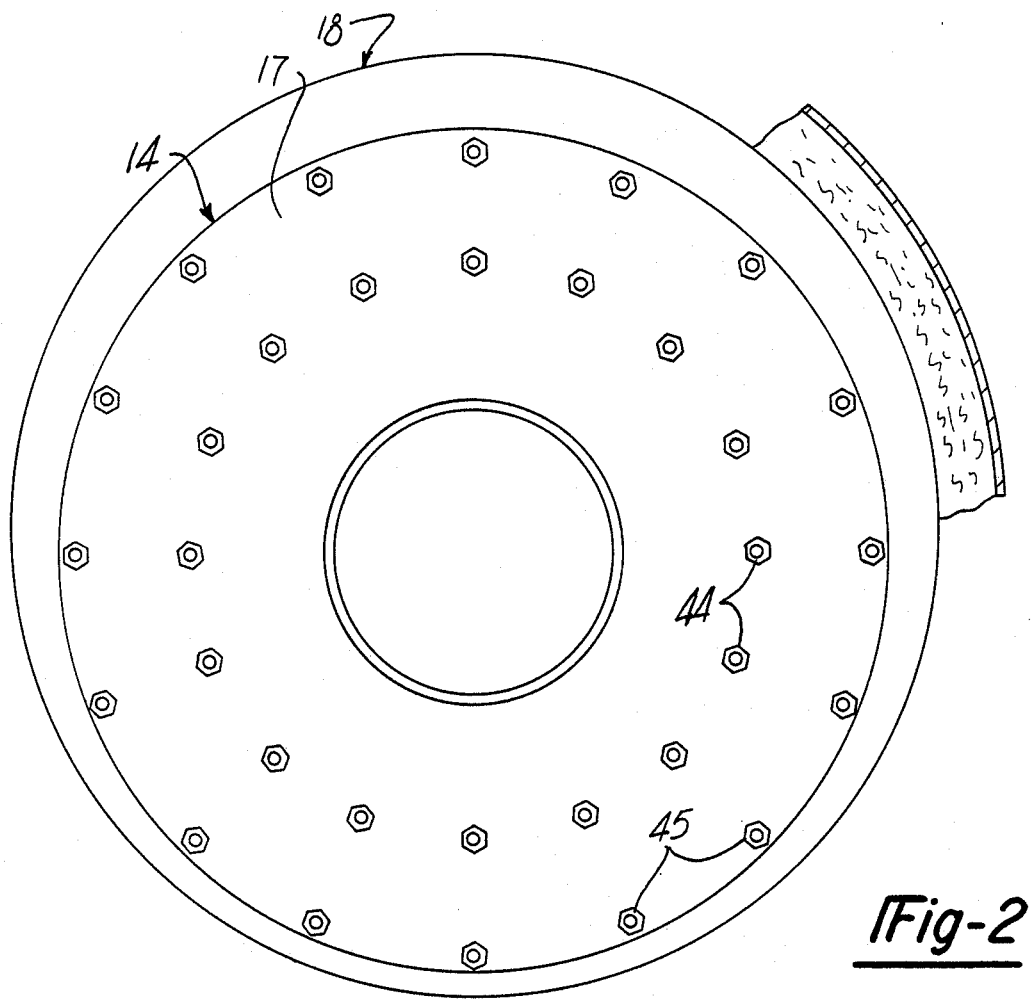
_Fig-2_
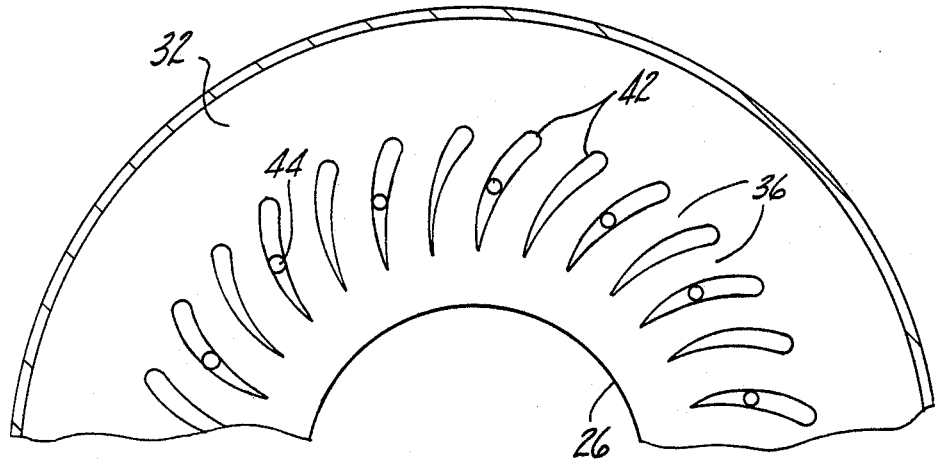
_Fig-3_

TURBOCHARGER HOUSING

This application is a file wrapper continuation of Ser. No. 890,785, filed July 23, 1986, now abandoned, which is a file wrapper continuation of Ser. No. 739,423, filed May 30, 1985, also now abandoned.

BACKGROUND OF THE INVENTION

I. Field of the Present Invention

The present invention relates generally to a housing for enclosing the compressor and turbine rotors of the turbocharger, and more particularly to such a housing having removable end portions which provide free access to the components housed within the central portion of the turbocharger housing.

II. Description of the Prior Art

A turbocharger is a well known device for increasing the pressure with which the air is introduced into an engine. Typically, the turbocharger includes a shaft rotatably mounted in the housing. One end of the shaft includes a turbine rotor while the opposite end of the shaft includes a compressor rotor. As exhaust gases from the engine are discharged against the turbine rotor, the shaft rotates, which in turn rotates the compressor rotor to generate highly pressurized air which can be introduced to a carburetor, intake manifold or the cylinders of the engine. Unfortunately, inspection, repair and replacement of the components of the turbocharger housing can often be difficult and time consuming to accomplish.

Since the turbine section and the compressor section of a turbocharger are in fluid communication with the exhaust system and intake system respectively of the engine, it is important that the housing portions form enclosed fluid passageways for completing the exhaust and intake circuits. Moreover, since the need for access to the assembly of the components within the housing requires that the housing be made in two ore more parts, the parts must be sealed against each other to avoid leakage from the flow passageways. As a result, it has been known to use special connectors which tightly seal the housing parts to each other. However, such connectors must be specially fabricated and installed and thus tend to increase the cost of the turbocharger construction.

Moreover, if the turbocharger housing is made only in two pieces, for example, a housing having a single open end which is enclosed by an end housing portion, the turbine rotors and shaft must be completely removed for inspection of each of the components. Furthermore, although it has been known to provide an end housing portion on each end of a central housing portion which carries the turbine shaft, the previously known end housings are not well adapted for controlling the flow of gas passing therethrough. In particular, while such end housings have been designed for enclosing the corresponding rotor in a predetermined directional orientation with the flow passageways, such end plates have not been designed to introduce additional swirl components or other flow controls for optimum flow characteristics through the turbine housing.

SUMMARY OF THE PRESENT INVENTION

The present invention overcomes the above mentioned disadvantages by providing a turbocharger housing comprising a central housing portion having means for rotatably supporting the turbocharging shaft, and two end housing portions adapted to sealingly engage the axial ends of the central housing portion to enclose a turbine chamber and a compressor chamber therebetween. The end portions are removably secured to the central housing portion, preferably by a plurality of bolts extending through mating, annular surface portions at the axial ends of the central housing portion and the end portions of the housing. Moreover, the end housing portions can be particularly configured to define flow controlling passageways which include means for imparting particular flow characteristics to the flow of gases passing through the turbocharger.

In the preferred form of the invention, the end housing portions include a plurality of vanes integrally formed with the end housing portion and which extend toward a mating surface on the central housing portion. In the preferred embodiment, mounting bores extend through the annular surface of the central housing portion in registration with locking bores in the vanes formed on the end housing portion. In addition, additional mating surfaces radially spaced from the vanes formed on the end housing portion are also coupled together by bolt means extending through the mating surfaces throughout the circumference of the housing.

Preferably, the vanes on an end housing protion are formed to extend in an interconnecting passageway defined by a recessed wall in the end housing portion and a annular surface at the axial end of the central housing portion. The passageway formed thereby interconnects an annular cavity formed in the end housing portion spaced radially away from the axis of the housing and an axial cavity formed in the end housing portion adapted to receive a rotor. Thus, optimal flow characteristics can be imparted to the gases flowing through the turbine section or compressor section of the turbocharger. Moreover, the flow pattern can easily be changed by removing the end housing portion and re-machining the vanes protruding axially outward from the end housing portion. Moreover, the central housing portion can be removed in its entirety for inspection and repair of the rotors, the shaft, or the bearing means supporting the shaft in the housing.

Thus, the present invention provides a turbocharger housing which is substantially simpler to construct and assemble than previously known turbocharger housings. Moreover, the housing of the present invention provides greater control over the flow characteristics of gases flowing through the turbine or compressor portions of the turbocharger. In addition, the present invention provides a tight sealing engagement between separable portions of the housing and avoids the need for complex sealing or connecting structures.

BRIEF DESCRIPTION OF THE DRAWING

The present invention will be more clearly understood by reference to the following detailed description of the preferred embodiment, when read in conjunction with the accompanying drawing in which like reference characters refer to like parts throughout the views, and in which:

FIG. 2 is a completed elevational view taken substantially along the line 2—2 in FIG. 1 with parts removed for the sake of clarity; and FIG. 3 is a completed sectional elevation taken substantially along the line 3—3 in FIG. 1.

DETAILED DESCRIPTION OF THE PREFERRED EMBODIMENT OF THE PRESENT INVENTION

Figure 1:
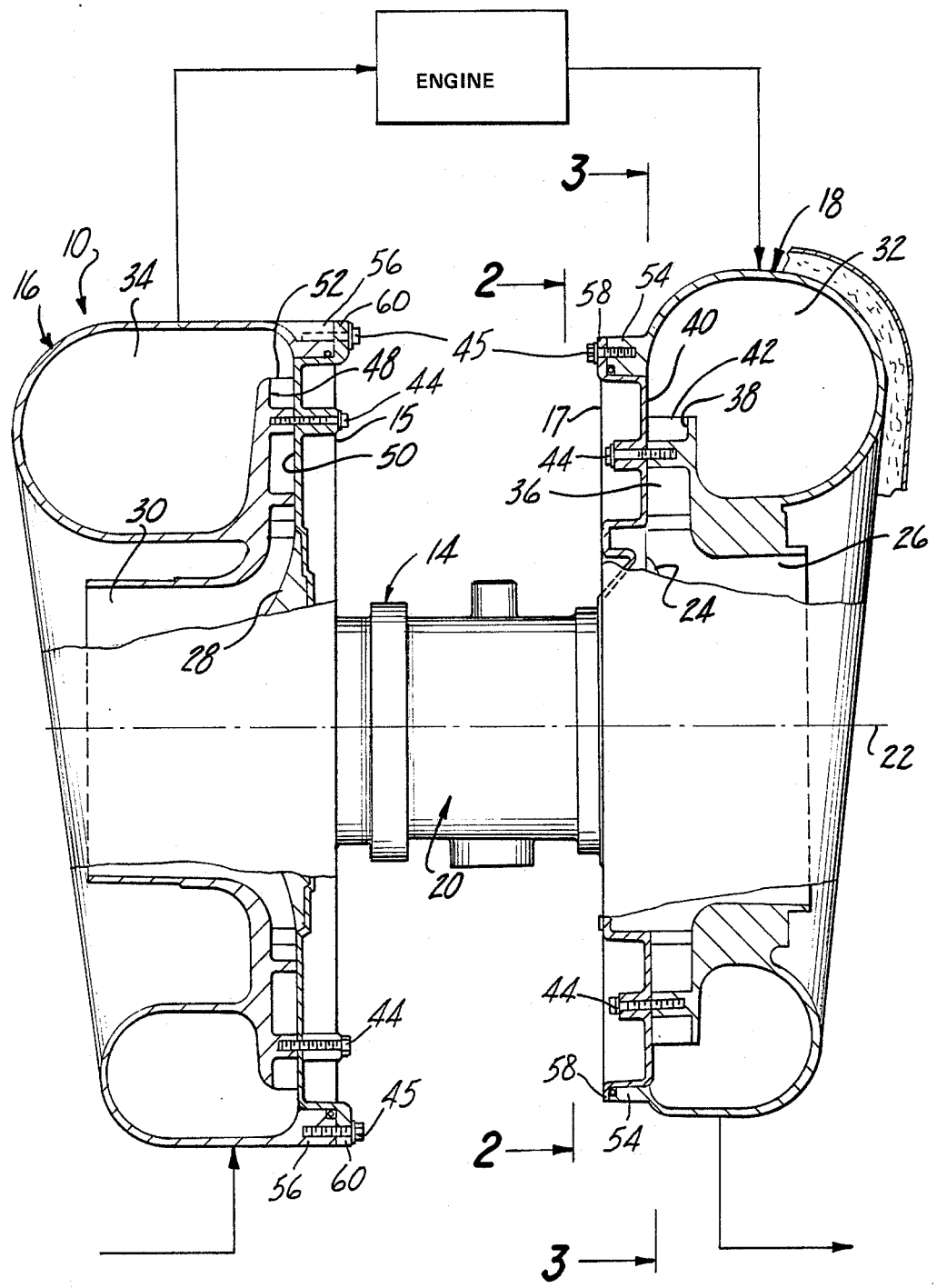
FIG. 1 is a sectional view of a turbocharger housing in accordance with the present invention.

Referring first to FIG. 1, a turbocharger 10 according to the present invention is thereshown enclosed by a housing 12 comprising a central housing portion 14 and end housing portions 16 and 18. The central housing portion 14 includes bearing means generally designated at 20 adapted to rotatably support turbine shaft about centerline 22 within the housing 12.

A turbine rotor 24 is secured to one end of the shaft 22 and extends outwardly from the central housing portion 14 into an axial cavity 26 in the end housing portion 18 forming an exhaust gas outlet for the turbocharger 10. Similarly, a compressor rotor 28 is secured to the other end of the shaft 22 and extends outwardly from the central housing portion 14 into an axial cavity 30 of the end housing portion 16 forming an air inlet for aspiration of the engine. In addition, each end housing portion 16 and 18 includes a substantially annular cavity 34 and 32, respectively, preferably in the form of a tapering toroid for controlling the air flow generated by the rotor 28 and discharged toward the rotor 24, respectively.

The annular cavity 32 is interconnected to the axial cavity 26 by a passageway 36 formed between a recessed wall surface 38 in the end housing portion 18 and an annular wall surface 40 on the central housing portion 14. Preferably, a plurality of flow directing vanes 42 are formed integrally with the end housing portion 18 so as to extend axially from the recessed wall 38 toward the annular wall surface 40 of the central housing portion 14. In a similar manner, the end housing portion 16 includes vanes 52 integrally formed with the housing portion 16 to extend from a recessed wall 48 toward the annular wall surface 50 of the central housing portion 14, and thereby forms a vaned passageway 46 intermediate the annular cavity 34 and axial cavity 30. By integrally formed it is meant that the vanes 42, 52 and the end housing portions 16, 18 are molecularly continuous. Preferably they are cast as one.

As shown diagrammatically in FIG. 1, the cavity 34 directs the flow of pressurized air generated by the rotor 28 to the air intake passages 35 of the engine 11 through an appropriate connecting passageway. Moreover, the exhaust passages 33 of the engine 11 are connected in fluid communication with the annular cavity 32 by an appropriate connecting passageway. As a result, the exhaust gases discharged against the turbine rotor 24 cause rotation of the shaft 22, whereby compressor rotor 28 generates high pressure air delivered to the air intake system of the engine 11 in a well known manner.

The end housing portions 16 and 18 are removably secured to the central housing portion 14, preferably by bolts 44 positioned through mating annular surface portions of the housing portions. As a result, as shown in FIG. 1, it is especially advantageous to position bolts 44 through the radially extending end portions 15 and 17 of the housing 14 in registration with the vane bodies 42, 52 formed on the end portion 16 and 18. In the preferred embodiment, the bolts 44 extend through a bore in the central housing portion 14 and are threadably engaged in locking bores in the vane bodies 42, 52 of the end housing portions 16 and 18 respectively.

Moreover, in this preferred embodiment the end portions 16 and 18 and the central housing portion 14 include additional annular mating surfaces. In particular, it can be seen that the peripheral edge portions 56 and 54, respectively, overlap peripheral portions of the central housing portion 14, and include a surface which matingly engages an annular surface 60 and 58, respectively on the radially expanded walls 15 and 17 of the central housing portion 14. Bolts 45 are threadably engaged in the periphal edge portions 56 and 54 to tightly secure the end portions 16 18 to the central housing portion.

Having thus described the important structural features of the preferred embodiment, it will be understood that when maintenance or repair upon the turbocharger is necessary, the end housing portions 16 and 18 can be readily removed from the central housing portion 14 by removal of the bolts 44, 45 and without disassembly of the means for rotatably mounting the shaft in the central housing portion. Moreover, it will be understood that removal of the end housing portions 16 and 18 also permits the vaned passageways 36 and 46 to be modified as the vanes 42 and 52 are readily accessible for machining. Furthermore, removal of the end portions 16 and 18 provides free access to the entire turbocharger mechanism without complicated disassembly of numerous housing parts as with some previously known turbocharger units. In addition, the positioning of the mounting bolts through housing portions having mating surfaces provides tight and secure engagement between the housing portions and thereby enclosing flow passageways formed by the cavities in the end portions. Nevertheless, the end portions are easily removed for modification or repair of the turbocharger components.

Having thus described my invention, many modifications thereto will become apparent to those skilled in the art to which it pertains without departing from the scope and spirit of the present invention as defined in the appended claims.

What is claimed is:

1. A housing for a turbocharger having a turbine rotor and a compressor rotor secured to a rotatable shaft, comprising:
   a central housing having means for rotatably supporting said shaft, said central housing having a pair of axial end portions, each axial end portion having at least one annular and outwardly facing end surface;
   two end housings, each of said end housings having a peripheral housing portion which sealingly engages one of said outwardly facing end surfaces so that one end housing encloses said turbine rotor and so that the other end housing encloses said compressor rotor, each of said end housing including a plurality of spaced apart vanes, each of said vanes having an end which abuts against one said annular end surfaces of said central housing;
   wherein each end housing with its associated vanes are of a one piece construction; and
   means for detachably securing each of said end housings to said central housing, said securing means comprising a plurality of threaded fasteners each of which extends through the axial end portions and threadably engages a threaded bore in one of said vanes.

2. The invention as defined in claim 1 and comprising a layer of insulation on an outer surface of one of said end housings.

* * * * *